Feb. 13, 1940.    W. CECIL    2,190,441
POURING CAN FOR COFFEE URNS
Filed Sept. 9, 1939
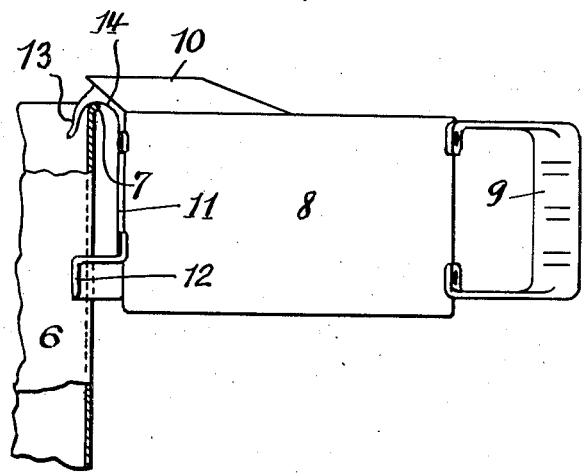
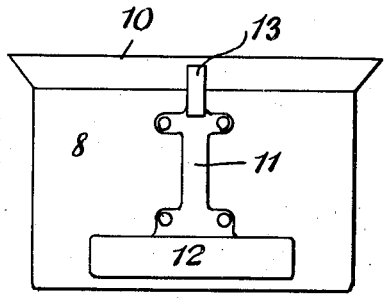
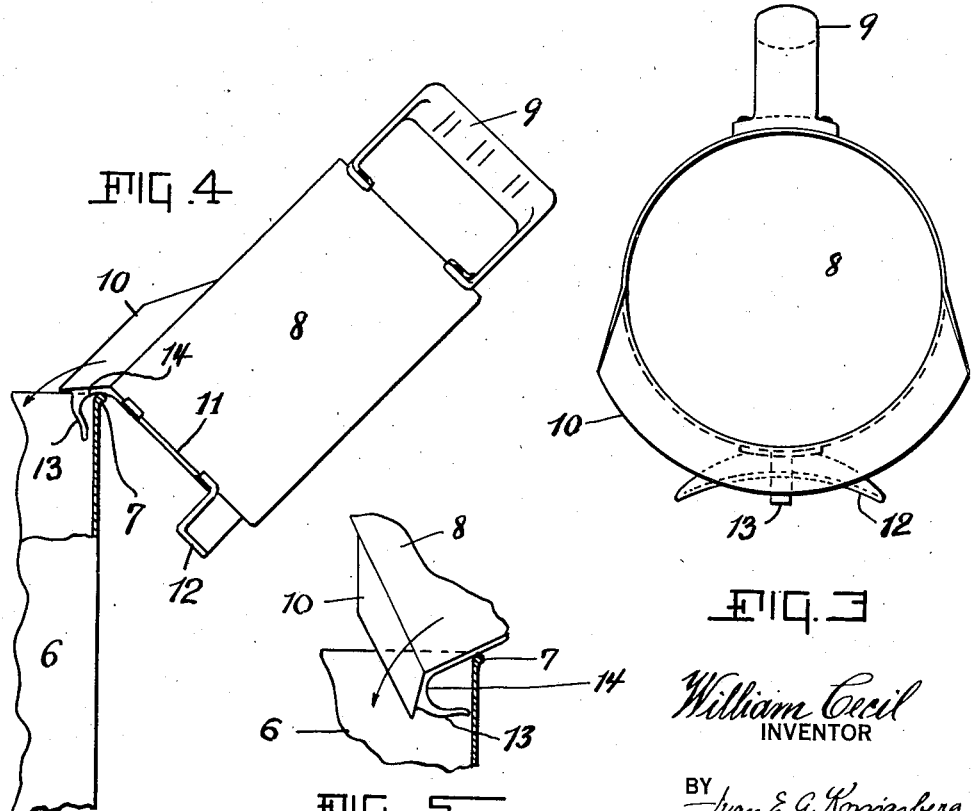
William Cecil
INVENTOR
BY Ivan E. A. Konigsberg
ATTORNEY Patented Feb. 13, 1940

2,190,441

UNITED STATES PATENT OFFICE 2,190,441

POURING CAN FOR COFFEE URNS

William Cecil, New York, N. Y.

Application September 9, 1939, Serial No. 294,131

2 Claims. (Cl. 221—11)

This invention relates to improvements in cans or vessels which are used in connection with the operation of coffee urns for the making of coffee. In making coffee in a coffee urn of the type used at soda fountains and restaurants a certain quantity of water is poured into the urn to percolate down through a bag or container of coffee. Thereafter a quantity of the made coffee is drawn off into a can. Sometimes it is called a repouring can. Then this can is lifted to the top of the urn and the contents poured into the urn to again percolate through the coffee therein to strengthen it.

Such repouring cans are made to hold a gallon of liquid and the weight thereof is about seven and a half pounds. It is therefore a matter of some trouble and effort to lift the filled repouring can to the top of the urn and pour the scalding hot liquid into the urn without having any support for the can. Sometimes women attend the coffee urns and the work of repouring is for them very hard and fatiguing. In many instances it has been found that the lifting of a filled gallon can to the top of the urn and tilting it to pour in the liquid is a task, which although not beyond the powers of the attendant, nevertheless is accomplished only by extreme effort and spillings and scaldings occur.

The object of this invention is to improve the construction of such repouring cans or vessel and to provide means whereby the same may be easily supported at the top of the urn and easily tilted to pour in the liquid thereby avoiding spilling and extreme efforts on the part of the attendant. Accordingly this invention is embodied in a can or vessel for the purpose set forth constructed as hereinafter described and as illustrated in the accompanying drawing in which Fig. 1 is a side view of the can lifted to the top of the coffee urn into a supported position thereon.

Fig. 2 is a front view of the can.

Fig. 3 is a plan view of the can.

Fig. 4 shows the can tilted to pour the liquid into the urn.

Fig. 5 is a fragmentary view showing the can fully tilted to finish the pouring operation.

In the drawing the coffee urn partly broken away and partly in section is sufficiently indicated at 6 for an understanding of the invention. The top edge of the urn is shown at 7. The can as a whole is marked 8. It is a circular vessel having a suitable handle 9 and a pouring lip 10 extending about half way around the front of the can. To the latter in the front there is secured a bracket 11 shaped to form a supporting concave foot 12 and a hook 13. The latter has a specially formed inner rounded resting and pivoting surface at 14.

In pouring liquid into the urn 6, either for repouring or for filling the urn, the filled can 8 is lifted to the top of the urn into the position shown in Fig. 1 with the hook 13 hooked in over the urn edge 7 and the foot 12 resting against the side of the urn to prevent swaying or lateral motion. Thus the operator is relieved of the weight of the filled can, the operation being a simple hook-in over the edge of the urn. The operator now pours the liquid from the can into the urn by a simple tilting movement as shown in Fig. 4 during which practicaly all the weight of the can rests upon the urn and the tilting operation is easily accomplished, the hook pivoting inner surface 14 riding on the top of the urn as will be understood. Without any special effort the tilting and pouring is continued until the can is finally tilted as shown in Fig. 5 and all the liquid has been poured into the urn.

The improved can has been tested in practice. It has been found that by reason of the fact that the can is merely lifted to a definite position of rest as shown in Fig. 1 and thereafter tilted without at the same time being lifted, the entire operation is easily and quickly accomplished without requiring any special attention or care on the part of the operator. The lifting of the can to its rest position at the top of the urn acts as a break in the operation, relieves the operator of the task of supporting the can and immediately thereafter the pouring operation is done in a natural easy manner.

I claim:

1. As a new article of manufacture a pouring can for coffee urns comprising a can body adapted to contain a liquid, a handle secured to the rear of said body, a pouring lip secured to the front portion of said body, a bracket secured to the front of said body below said pouring lip, said bracket forming a hook at its upper end and a concave foot at its lower end, said hook being adapted to be hooked in over the upper edge of a coffee urn, said foot being shaped to rest against the side of said coffee urn whereby to facilitate the operation of lifting the can filled with liquid to the top of the coffee urn and pouring the liquid into the urn.

2. As a new article of manufacture a pouring can for coffee urns comprising a can body adapted to contain liquid, a handle secured to the rear of said body, an outwardly projecting pouring lip secured to the upper edge of said body in the front thereof, a hook secured to the front of said body below said pouring lip, a concave foot secured to the front of said body below said hook near the bottom of the body, said hook being adapted to be hooked in over the upper edge of a coffee urn, said concave foot being adapted to rest against the side of the body when said hook is positioned as aforesaid, said hook having an inner rounded surface adapted to rest upon and slide upon the upper edge of the coffee urn when said can is tilted for pouring whereby said can rests upon said upper edge of the urn during the pouring operation to facilitate the same.

WILLIAM CECIL.